Figure 1:
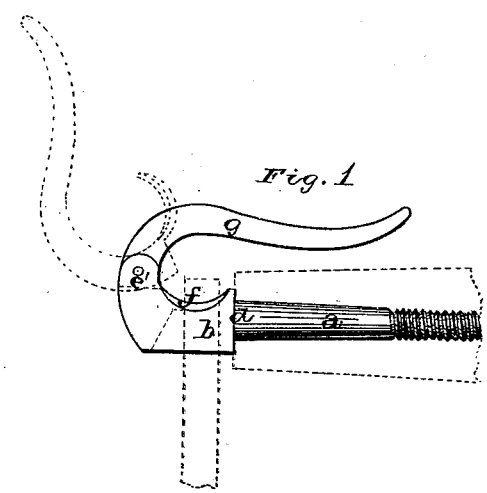
Figure 2:

La F. HARTSON.
TRACE FASTENING.

No. 180,762. Patented Aug. 8, 1876.

WITNESSES.
J. Wm Garner
F. M. Burnham.

INVENTOR=
L. F. Hartson
per
F. A. Lehmann, Atty.

UNITED STATES PATENT OFFICE.

LA FAYETTE HARTSON, OF WYOMING, IOWA.

IMPROVEMENT IN TRACE-FASTENINGS.

Specification forming part of Letters Patent No. 180,762, dated August 8, 1876; application filed May 2, 1876.

*To all whom it may concern:*

Be it known that I, LA FAYETTE HARTSON, of Wyoming, in the county of Jones and State of Iowa, have invented certain new and useful Improvements in Whiffletrees; and I do hereby declare the following to be a full, clear, and exact description of the invention, such as will enable others skilled in the art to which it pertains to make and use it, reference being had to the accompanying drawings, which form part of this specification.

My invention relates to a trace-hook for use upon the ends of whiffletrees, for holding, attaching, and detaching the traces at will; and consists in the construction whereby the trace is held securely, and can be readily attached and detached.

The accompanying drawings represent my invention, and form a part of this specification.

$a$ represents the shank of my hook, which is usually screw-threaded at its inner end, as shown, while at the outer end of the shank is an enlargement, $b$, hollowed out upon the front side, as at $c$, and forming a proper shoulder or bearing, $d$, to limit the distance that the shank shall enter the end of the whiffletree. At the outer end of the enlargement $b$ a hooked end projects, and in this is a longitudinal mortise, $e$, which receives a swinging bearing and lever, $f$ $g$, held by means of the pivoted pin $e'$. The bearing $f$, when in its usual and normal position, rests in and conforms to the hollow $c$, which supports it and prevents its misplacement. The lever $g$ that operates this bearing remains, when in its normal position, parallel with the shank, or nearly so, and secures the end of the trace from getting off the bearing, while the latter in turn is held in its seat by the trace, and consequently the lever is held close down to the end of the trace.

In order to place the tug or trace upon the hook, take hold of the lever and turn it outward and in line with the shank, or nearly so, and slip the eye in the trace over the said handle, and turn the handle back to its normal position, which brings the bearing $g$ to its seat $c$, and the trace is forced to pass over the hooked end of the shank, and find its proper seat upon the bearing $g$.

To release the trace, the movement is the reverse. The lever is grasped and turned outward, which carries the eye in the trace over the outer end of the shank and off the handle.

The long lever gives a great purchase, and the operator has the shipping and unshipping of the trace fully under control, and it matters not whether the traces are slack or the horses down and the traces taut, they can be released with ease and in a moment.

My device is not liable to get out of repair, is cheap and simple, and can be applied to all whiffletrees new or old, and is compact and safe.

Figure 3:
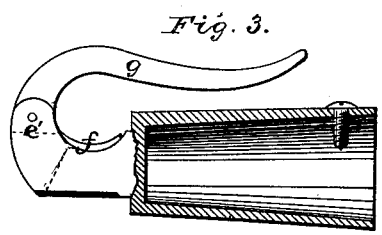

Ferrules or washers may be used in connection with the screw-shank; or, instead of the screw-shank, a socket, as shown in Fig. 3, may be used to secure the device to the ends of the whiffletree.

I am aware that a hook somewhat similar to mine in form has been used as a holdback, and this I disclaim.

In my invention the bearing $f$ for the end of the trace is so formed that the stronger the pull upon the trace, the stronger is the lever held in position.

What I claim is—

In a trace-hook, the combination of the shank $a$, having its outer end $b$ slotted, as shown, in combination with the hook $g$, having the bearing $f$, and a flange to enter the said slot to receive the pivot-pin, the said hook being provided with neither spring nor shoulder, so that it can be swung entirely around to throw off the trace, as specified.

In testimony that I claim the foregoing I have hereunto set my hand this 25th day of April, 1876.

LA FAYETTE HARTSON.

Witnesses:
 JOHN WAITE,
 F. L. HODGMAN.